United States Patent
Trail

(10) Patent No.: US 12,078,803 B1
(45) Date of Patent: *Sep. 3, 2024

(54) EXPANDING FIELD-OF-VIEW IN DIRECT PROJECTION AUGMENTED REALITY AND VIRTUAL REALITY SYSTEMS

(71) Applicant: META PLATFORMS TECHNOLOGIES, LLC, Menlo Park, CA (US)

(72) Inventor: Nicholas Daniel Trail, Bothell, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 321 days.

This patent is subject to a terminal disclaimer.

(21) Appl. No.: 17/122,400

(22) Filed: Dec. 15, 2020

Related U.S. Application Data

(63) Continuation of application No. 15/670,730, filed on Aug. 7, 2017, now Pat. No. 10,895,746.

(51) Int. Cl.
  *G02B 27/01* (2006.01)
  *G02B 27/00* (2006.01)
  *G06F 3/01* (2006.01)
  *G06T 19/00* (2011.01)

(52) U.S. Cl.
  CPC ..... *G02B 27/0172* (2013.01); *G02B 27/0012* (2013.01); *G02B 27/0025* (2013.01); *G06F 3/013* (2013.01); *G06T 19/006* (2013.01)

(58) Field of Classification Search
  CPC .. G02B 27/01; G02B 27/0101; G02B 27/017; G02B 27/0172; G02B 27/0176; G02B 27/0179; G02B 27/0012; G02B 27/0025; H04N 13/044; H04N 5/7491; G06F 3/013; G06T 19/006
  USPC ........ 359/13–14, 629–633; 348/115; 349/11; 345/7–9
  See application file for complete search history.

(56) References Cited

U.S. PATENT DOCUMENTS

| | | | |
|---|---|---|---|
| 5,452,385 | A | 9/1995 | Izumi et al. |
| 5,966,112 | A | 10/1999 | Katagiri et al. |
| 6,429,913 | B2 | 8/2002 | Putilin |
| 8,233,204 | B1 | 7/2012 | Robbins et al. |

(Continued)

FOREIGN PATENT DOCUMENTS

| | | | |
|---|---|---|---|
| CN | 107422845 A | * 12/2017 | |
| CN | 109073891 A | * 12/2018 | ......... G02B 27/0172 |

OTHER PUBLICATIONS

Machine translation of CN109073891 A (Year: 2023).*

(Continued)

*Primary Examiner* — Travis S Fissel
(74) *Attorney, Agent, or Firm* — Jordan IP Law, LLC

(57) ABSTRACT

A near-eye display (NED) includes a source assembly, a waveguide outside a field-of-view of a user, and a main optic within the field-of-view. The waveguide expands light emitted from the source assembly in at least one dimension and out-couple the expanded light. The main optic is partially transparent and is positioned such that the user of the NED looks through the main optic to view a local area surrounding the NED. The main optic receives light from the local area, combines the received light with the expanded light to generate combined light, and directs the combined light to the user's eye-box.

20 Claims, 4 Drawing Sheets

(56) References Cited

U.S. PATENT DOCUMENTS

| | | | |
|---|---|---|---|
| 8,508,830 | B1 | 8/2013 | Wang |
| 9,762,851 | B1 | 9/2017 | Baumert et al. |
| 10,497,295 | B1 | 12/2019 | Jia et al. |
| 10,613,332 | B1 | 4/2020 | Holmes et al. |
| 10,672,310 | B2 | 6/2020 | McGlew et al. |
| 10,677,966 | B1 | 6/2020 | Ouderkirk et al. |
| 2002/0101643 | A1 | 8/2002 | Kobayashi |
| 2004/0160535 | A1 | 8/2004 | Chuman et al. |
| 2010/0245321 | A1 | 9/2010 | Ogita et al. |
| 2010/0246003 | A1 | 9/2010 | Simmonds et al. |
| 2010/0271537 | A1 | 10/2010 | Endoh et al. |
| 2012/0120498 | A1* | 5/2012 | Harrison ............... G06F 3/012 359/630 |
| 2012/0235886 | A1* | 9/2012 | Border ................... G06F 3/013 345/8 |
| 2013/0016413 | A1 | 1/2013 | Saeedi et al. |
| 2013/0021226 | A1 | 1/2013 | Bell |
| 2013/0314793 | A1 | 11/2013 | Robbins et al. |
| 2014/0168260 | A1 | 6/2014 | O'Brien et al. |
| 2015/0015818 | A1 | 1/2015 | Kim et al. |
| 2015/0260995 | A1 | 9/2015 | Mukawa |
| 2016/0041384 | A1 | 2/2016 | Robbins et al. |
| 2016/0044276 | A1 | 2/2016 | Shearman et al. |
| 2016/0048017 | A1 | 2/2016 | Kasahara et al. |
| 2016/0055822 | A1 | 2/2016 | Bell |
| 2016/0241217 | A1 | 8/2016 | Sazegar et al. |
| 2016/0262608 | A1 | 9/2016 | Krueger |
| 2016/0270656 | A1 | 9/2016 | Samec et al. |
| 2016/0282635 | A1 | 9/2016 | Yang et al. |
| 2016/0286204 | A1 | 9/2016 | Grata et al. |
| 2016/0295202 | A1* | 10/2016 | Evans ................. H04N 13/322 |
| 2016/0306171 | A1* | 10/2016 | Rudolph ................ G02C 5/146 |
| 2016/0379606 | A1 | 12/2016 | Kollin et al. |
| 2017/0045746 | A1* | 2/2017 | Ellsworth .......... G02B 27/0176 |
| 2017/0068119 | A1 | 3/2017 | Antaki et al. |
| 2017/0068311 | A1 | 3/2017 | Evans et al. |
| 2017/0097506 | A1 | 4/2017 | Schowengerdt et al. |
| 2017/0131545 | A1 | 5/2017 | Wall et al. |
| 2017/0295362 | A1* | 10/2017 | Travis ................. H04N 13/128 |
| 2017/0351090 | A1 | 12/2017 | Sekiya et al. |
| 2018/0203231 | A1 | 7/2018 | Glik et al. |
| 2018/0210195 | A1 | 7/2018 | Chee et al. |
| 2018/0348522 | A1 | 12/2018 | Young et al. |
| 2019/0041634 | A1 | 2/2019 | Popovich et al. |
| 2019/0206134 | A1 | 7/2019 | Devam et al. |
| 2019/0206137 | A1* | 7/2019 | Siddiqui ................... G06T 7/20 |
| 2020/0120322 | A1* | 4/2020 | Ogasawara .......... H04N 13/122 |

OTHER PUBLICATIONS

Non-Final Office Action mailed Jul. 8, 2021 for U.S. Appl. No. 16/796,008, filed Feb. 20, 2020, 16 pages.

Final Office Action mailed Aug. 10, 2021 for U.S. Appl. No. 16/796,008, filed Feb. 20, 2020, 8 pages.

"4K e-shift 3 Technology | DLA-X900R/DLA-X700R/DLA-XSOOR | JVC," JVC Kenwood Corporation, undated, 5 pages, [Online] [Retrieved on Mar. 19, 2018] Retrieved from the Internet <URL:http://eu.jvc.com/microsite/eu/dla-x900r/feature01.html>.

Non-Final Office Action mailed Oct. 26, 2022 for U.S. Appl. No. 17/461,263, filed Aug. 30, 2021, 7 pages.

\* cited by examiner

EXPANDING FIELD-OF-VIEW IN DIRECT PROJECTION AUGMENTED REALITY AND VIRTUAL REALITY SYSTEMS

CROSS REFERENCE TO RELATED APPLICATIONS

This application is continuation of co-pending U.S. application Ser. No. 15/670,730, filed Aug. 7, 2017, which is incorporated by reference in its entirety.

BACKGROUND

The present disclosure generally relates to controlling a visual field-of-view in augmented reality (AR) and virtual reality (VR) systems, and specifically relates to expanding a field-of-view in direct projection AR and VR systems.

In conventional AR and VR systems, there is a trade-off between a presented visual field-of-view and a user's eye-box. The user's eye-box represents a three-dimensional volume in which the user's eye is located to receive light. To achieve large eye-box capabilities, a large etendue in an optical system is required. This can be accomplished with a sufficiently large optical system. However, this optical system generates more waste heat, has a larger volume, and/or has a larger weight. Alternatively, the large eye-box capabilities can be achieved by sacrificing a potential field-of-view that can be obtained.

One approach to brake the trade-off between a size of an eye-box and a size of a field-of-view in AR and VR systems is through pupil replication by using waveguides. The trade-off between the size of eye-box and the size of field-of-view can be removed by reducing a brightness that is perceived by the user. This can be achieved by, e.g., replicating a plurality of smaller eye-boxes in a tiled arrangement. However, this approach has its own challenges. For example, it is very difficult (if not impossible in some configurations) to present variable focus to the user, and address see-through quality and minimize scattering off of the waveguide with sub-wavelength (grating) features. Another approach for removing the trade-off between the size of eye-box and the size of field-of-view is based on reflective projection systems, e.g., AR glasses. However, this approach has both the field-of-view and eye-box limitations.

SUMMARY

An eyeglass-type platform representing a near-eye-display (NED) is presented herein. The NED may be part of a virtual reality (VR) system, an augmented reality (AR) system, a mixed reality (MR) system, or some combination thereof. The NED includes a source assembly that emits image light, a waveguide, and a main optic. The waveguide is located outside a field-of-view of a user, and the main optic is located within the field-of-view of the user. The waveguide is configured to expand the image light from the source assembly in at least one dimension and out-couple the expanded image light.

In some embodiments, the main optic is partially transparent and is positioned such that the user of the NED looks through the main optic to view a local area surrounding the NED. The main optic receives light from the local area. The main optic then combines the received light with the expanded image light to generate combined light, and directs the combined light to an eye-box.

In alternate embodiments, the main optic is positioned such that the user of the NED looks into the main optic to view the expanded image light from the waveguide display. The main optic blocks light from the local area, and propagates the expanded image light to the eye-box.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

A projection assembly integrated into a near-eye-display (NED) is presented herein. The NED may be part of, e.g., a virtual reality (VR) system, an augmented reality (AR) system, a mixed reality (MR) system, or some combination thereof. The NED may also be referred to as a head-mounted display (HMD). The projection assembly of the NED includes a source assembly, a waveguide, a main optic, and an optional focusing element. The source assembly generates image light that is coupled into the waveguide. The image light is expanded in at least one dimension and out-coupled from the waveguide. The focusing element (e.g., liquid crystal lens) may be located between the waveguide and the main optic. The focusing element can, e.g., add or subtract optical power to adjust focus of the image light. The main optic receives light from a local area surrounding the NED and combines that light with the image light received either directly from the waveguide or from the focusing element. The combined light is provided to an eye-box of a user.

Figure 1:
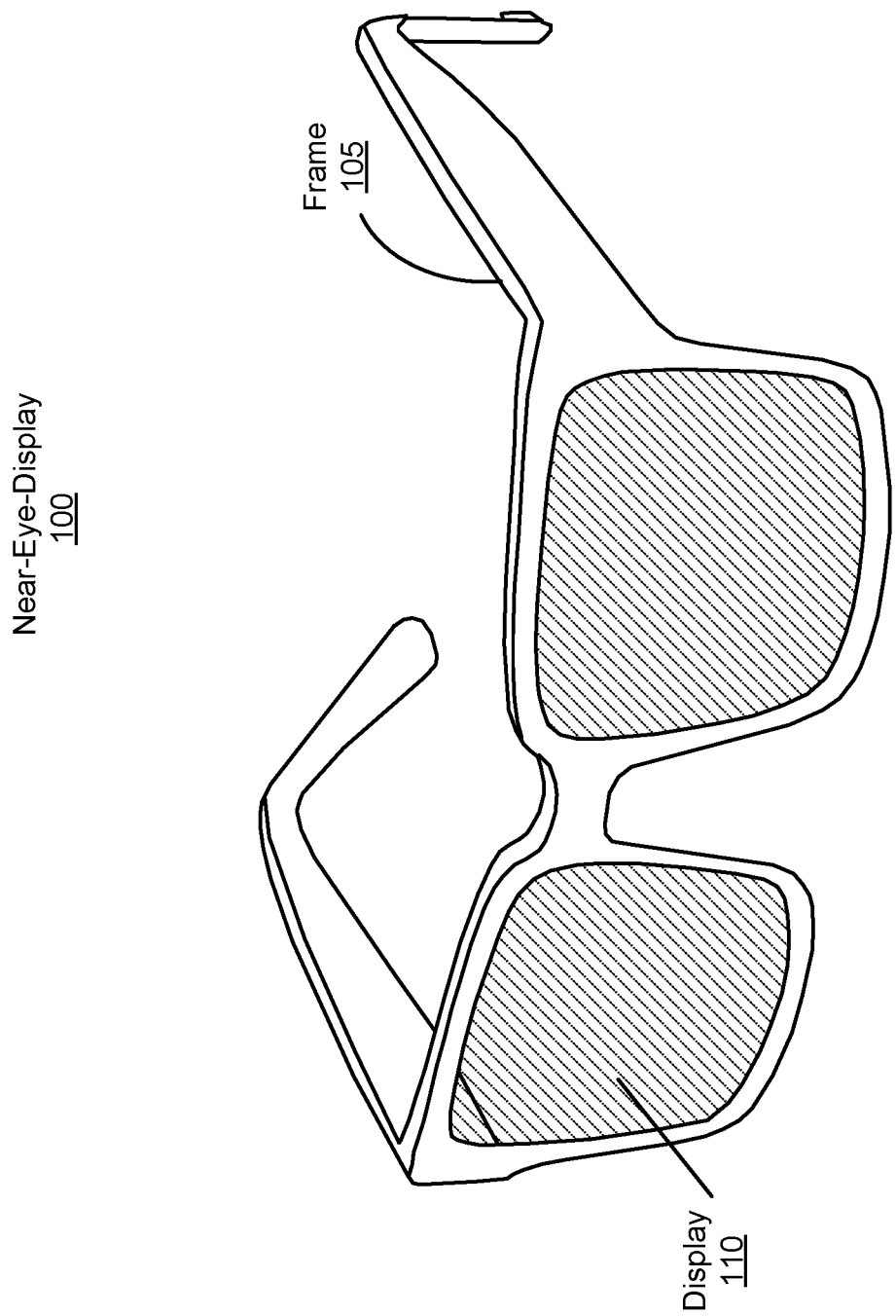
FIG. 1 is a diagram of a near-eye-display (NED), in accordance with an embodiment.

FIG. 1 is a diagram of a NED 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an AR NED. For example, in the NED 100 may augment views of a physical, real-world environment with computer-generated elements (e.g., images, video, sound, etc.). However, in some embodiments, the NED 100 may be modified to also operate as a VR NED, a MR NED, or some combination thereof.

The NED 100 shown in FIG. 1 includes a frame 105 and a display 110. The frame 105 includes one or more optical elements which together display media to users. The display 110 is configured for users to see the content presented by the NED 100. As discussed below in conjunction with FIGS. 2-3, the display 110 includes a projection assembly that generates an image light to present media to an eye of the user. The NED 100 shown in FIG. 1 is only an example of a VR system, an AR system, a MR system, or some combination thereof. However, in alternate embodiments, the NED 100 may also be referred to as a HMD.

Figure 2:
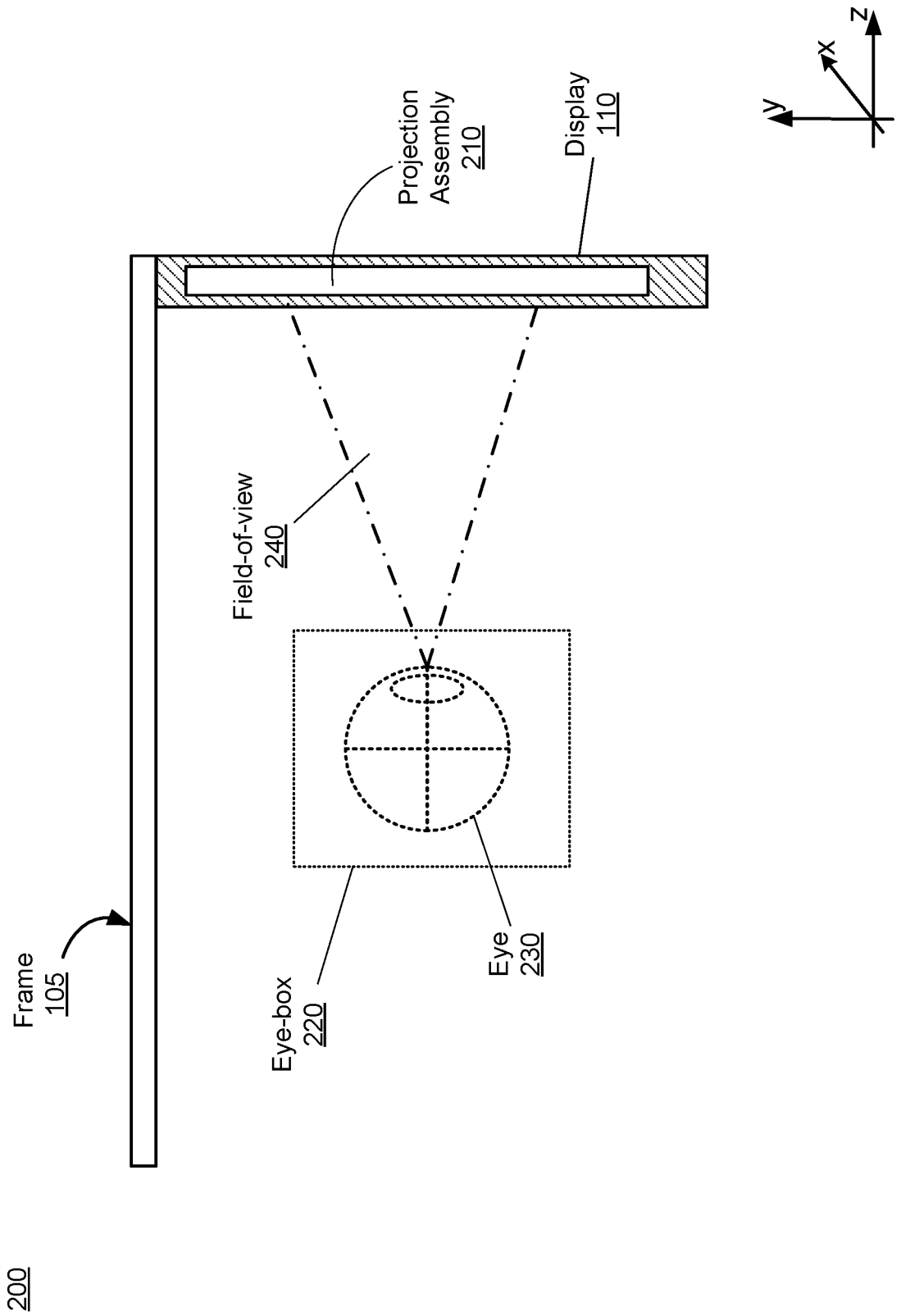
FIG. 2 is a cross-section of an eyewear of the NED in FIG. 1, in accordance with an embodiment.

FIG. 2 is a cross section 200 of an eyewear of the NED 100 illustrated in FIG. 1, in accordance with an embodiment. The cross section 200 includes at least one projection assembly 210 integrated into the display 110 and an eye-box 220. The eye-box 220 is a location where an eye 230 is positioned when a user wears the NED 100. In some embodiments, the frame 105 may represent a frame of eye-wear glasses. For purposes of illustration, FIG. 2 shows the cross section 200 associated with a single eye 230 and a single projection assembly 210. In alternative embodiments not shown, another projection assembly which is separate from the projection assembly 210 shown in FIG. 2, provides light to another eye 230 of the user.

The projection assembly 210 is configured to direct image light to the eye-box 220. In some embodiments, when the NED 100 is configured as an AR NED, the projection assembly 210 also directs light from a local area surrounding the NED 100 to the eye-box 220. As shown in FIG. 2, a portion of the projection assembly 210 is within a field-of-view 240 of the eye 230, whereas one or more other portions of the projection assembly 210 can be located outside the field-of-view 240. As discussed in more detail in conjunction with FIG. 3, the projection assembly 210 is implemented such that the field-of-view 240 is widened and a volume of the eye-box 220 is enlarged.

The projection assembly 210 may include multiple optical elements. The optical elements may act to, e.g., correct aberrations in image light emitted from the projection assembly 210, magnify the image light, perform some other optical adjustment of the image light, or some combination thereof. The example for optical elements may include an aperture, a Fresnel lens, a convex lens, a concave lens, a liquid crystal lens, a diffractive element, a waveguide, a filter, a polarizer, a diffuser, a fiber taper, one or more reflective surfaces, a polarizing reflective surface, a birefringent element, or any other suitable optical element that affects the image light emitted from the projection assembly 210 and propagates the light from the local area surrounding the NED 100. A specific structure of the projection assembly 210 is discussed in more detail in conjunction with FIG. 3.

In some embodiments, the NED 100 further includes an eye tracker (not shown in FIG. 2) for determining and tracking a position of the eye 230 in the eye-box 220, i.e., an angle and orientation of eye-gaze. Note that information about the position of the eye 230 in the eye-box 220 also includes information about an orientation of the eye 230 in the eye-box 220, i.e., information about user's eye-gaze location. Based on the determined and tracked position and orientation of the eye 230, the NED 100 adjusts image light emitted from the projection assembly 210. In some embodiments, the NED 100 adjusts focus of the image light and ensures that the image light is in focus at the determined angle of eye-gaze in order to mitigate the vergence-accommodation conflict (VAC). Additionally or alternatively, the NED 100 adjusts resolution of the image light by performing foveated rendering of the image light, based on the position of the eye 230. Additionally or alternatively, the NED 100 uses the information on a gaze position and orientation to provide contextual awareness for the user's attention, whether on real or virtual content. The eye tracker generally includes an illumination source and an imaging device (camera). In some embodiments, components of the eye tracker are integrated into the projection assembly 210. In alternate embodiments, components of the eye tracker are integrated into the frame 105.

Figure 3:
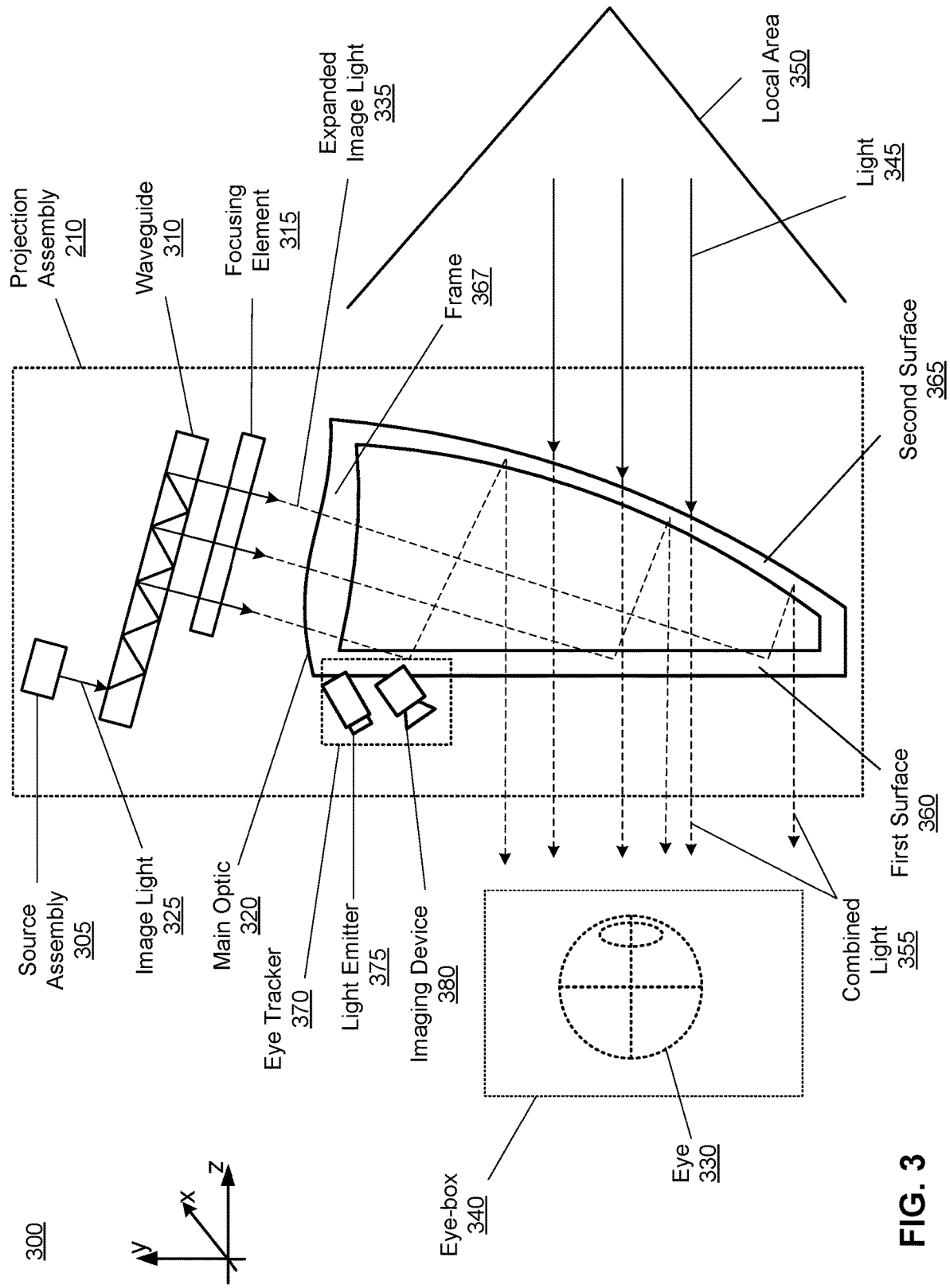
FIG. 3 is a cross-section of a projection assembly, in accordance with an embodiment.

FIG. 3 is a cross-section 300 of a projection assembly (e.g., the projection assembly 210 shown in FIG. 2), in accordance with an embodiment. An embodiment of the projection assembly shown in FIG. 3 comprises a source assembly 305, a waveguide 310, an optional focusing element 315, and a main optic 320.

The source assembly 305 is configured to emit image light 325. In one embodiment, the source assembly 305 includes an electronic display configured to emit the image light 325. In another embodiments, the source assembly 305 includes a one-dimensional array of micro light-emitting diodes (µLEDs) with a microelectromechanical system (MEMS) mirror. In yet another embodiment, the source assembly 305 includes a two-dimensional array of µLEDs. In yet another embodiment, the source assembly 305 includes a one-dimensional laser array with a one-dimensional scanning system (e.g., scanning MEMS mirror). In yet another embodiment, the source assembly 305 includes a two-dimensional scanning system with a laser source.

The waveguide 310 is located outside a field-of-view of an eye 330 of a user. The waveguide 310 is configured to expand the image light 325 from the source assembly 305 in at least one dimension and out-couple expanded image light 335. In some embodiments, the waveguide out-couples the expanded image light 335 toward the focusing element 315. In alternate embodiments, the waveguide out-couples the expanded light 335 directly to the main optic 320. Additional details regarding the waveguide 310 and the source assembly 305 may be found in, e.g., U.S. Pat. App. No. 62/436,717, which is hereby incorporated by reference in its entirety.

The focusing element 315 adjusts the expanded image light 335 by providing optical correction to the expanded image light 335. The focusing element 335 directs the expanded image light 335 after the adjustment to the main optic 320. The focusing element 315 may be implemented as a variable power optical element that adds or subtracts optical power to adjust certain properties of the expanded image light 335. Alternatively or additionally, the focusing element 315 can be implemented as a variable power optical element that adjusts the focus parameters of the expanded image light 335. In some embodiments, a controller coupled to the focusing element 315 (not shown in FIG. 3) controls the optical power of the focusing element 315 implemented as the variable power optical element.

In some embodiments, the focusing element 315 implemented as a variable power optical element and located between the waveguide 310 and the main optic 320 includes a liquid crystal lens. An optical power of the focusing element 315 implemented as a liquid crystal lens can be controlled based on a voltage level applied to the focusing element 315. In one or more embodiments, the voltage level applied to the focusing element 315 is controlled by a controller coupled to the focusing element 315 (not shown in FIG. 3). In other embodiments, the focusing element 315 implemented as a variable power optical element includes one or more lenses with liquid media and at least one actively controlled deformable surface, e.g., controlled by the controller to vary the optical power of the focusing element 315.

In alternate embodiments, the focusing element 315 located between the waveguide 310 and the main optic 320 is implemented as an optical element (lens) with a fixed optical power. In order to change an effective optical power of the focusing element 315, a distance (e.g., along x dimension) between the focusing element 315 and the main optic 320 is adjustable. The adjustable distance is determined by a controller (not shown in FIG. 3) coupled to the focusing element 315 and/or the waveguide 310, and is associated with a location of an estimated accommodation plane. In one embodiment, the controller instructs the focusing element 315 to move relative to the waveguide 310 (e.g., along x dimension). In another embodiment, the controller instructs the waveguide 310 to move relative to the focusing element 315 (e.g., along x dimension).

The main optic 320 in-couples the extended image light 335, and directs the extended image light 335 to an eye-box 340 where the eye 330 is located. In addition, the main optic 320 may propagate light 345 from a local area 350 surrounding some or all of the NED 100 to the eye-box 340. The main optic 320 is located within the field-of-view of the user's eye 330.

In some embodiments, e.g., the NED 100 is an AR NED, the main optic 320 is partially transparent and is positioned such that the user of the AR NED looks through the main optic 320 to view the local area 350. Upon reception of the light 345 from the local area 350, the main optic 320 combines the received light 345 with the expanded image light 335 to generate combined light 355. The combined light 355 thus combines virtual images (e.g., from the waveguide 310) with real-world images to generate combined augmented reality content for the user. The main optic 320 propagates the combined light 355 to the eye-box 340 where the user's eye 330 is located. The projection assembly 210 shown in FIG. 3 provides pupil expansion in an optical path, but not in the user's field-of-view as the waveguide 310 (and the optional focusing element 315) is located outside the user's field-of-view.

In some embodiments, the main optic 320 designed for the AR NED includes a first partially reflective optical surface 360 and a second partially reflective optical surface 365, with an air gap between the first partially reflective optical surface 360 and the second partially reflective optical surface 365. In one or more embodiments, the first partially reflective surface 360 and the second partially reflective surface 365 are coated to reflect the expanded image light 335 and to propagate the light 345 from the local area 350. The first partially reflective surface 360 and the second partially reflective surface 365 can be configured to reflect most of the expanded image light 335, e.g., approximately 95% or more, to the eye-box 340. In one or more embodiments, the first partially reflective surface 360 and the second partially reflective surface 365 adjust optical power of the expanded image light 335. Shapes of the first partially reflective surface 360 and the second partially reflective surface 365 may be of free form, as shown in FIG. 3. A frame 367 connects a first optical element of the main optic 320 having the first partially reflective optical surface 360 with a second optical element of the main optic 320 having the second partially reflective optical surface 365. The frame 367 may be monolithic. Alternatively, the frame 367 may be composed of multiple components (not shown in FIG. 3).

The first partially reflective optical surface 360 receives the expanded image light 335 at, e.g., a first incident angle. The first incident angle may be larger than a threshold angle, such that the first partially reflective surface 360 reflects the expanded image light 335 toward the second partially reflective surface 365. The threshold angle represents a minimum incident angle at which the expanded image light 335 reflects from the first partially reflective surface 360 instead of being transmitted. The threshold angle can be determined based on the design of the projection assembly and the main optic 320, and/or spacing between the first partially reflective surface 360 and the second partially reflective surface 365, while taking into account a projected field-of-view. In some embodiments, the threshold angle can be created by applying a dichroic coating on the first partially reflective surface 360 that provides a high reflectivity for a defined set of wavelength ranges above a defined angle, e.g., 45 degrees. The dichroic coating applied on the first partially reflective surface 360 may also provide a low reflectivity below and above the defined angle for all visible wavelengths outside of the defined set of wavelength ranges. The first partially reflective surface 360 can be coated to provide that the majority of the expanded image light 335 at (or in excess of) the threshold angle is reflected. Alternatively, the first partially reflective surface 360 can be coated to provide sufficiently good reflectance over a range of angles. The second partially reflective surface 365 receives the expanded image light 335 reflected from the first partially reflective surface 360 at, e.g., a second incident angle. The second incident angle may be smaller than the threshold angle such that the second partially reflective surface 365 directs the expanded image light 335 to the eye-box 340.

In some other embodiments (not shown), the main optic 320 designed for the AR NED is a single monolithic optical element that includes the first partially reflective optical surface 360 and the second partially reflective optical surface 365. The monolithic optical element can be made of a single lens with the partially reflective surfaces 360, 365. There is no air gap between the first partially reflective optical surface 360 and the second partially reflective optical surface 365. The first partially reflective optical surface 360 receives the expanded image light 335 at, e.g., a first incident angle. The first incident angle may be larger than a threshold angle such that the first partially reflective surface 360 reflects the expanded image light 335 toward the second partially reflective surface 365. The second partially reflective surface 365 receives the expanded image light 335 reflected from the first partially reflective surface 360 at, e.g., a second incident angle. The second incident angle may be smaller than the threshold angle such that the second partially reflective surface 365 directs the expanded light 335 to the eye-box 340.

The projection assembly 210 shown in FIG. 3 provides better quality image as the user is not looking through the waveguide 310. Additionally, the user's field-of-view is extended, and different positions of the eye 330 in the eye-box 340 are covered as a volume of the eye-box 340 is enlarged. Also, it should be noted that the free-form main optic 320 with the air gap between the first partially reflective optical surface 360 and the second partially reflective optical surface 365 is substantially lighter than the single monolithic element case.

In alternate embodiments, e.g., the NED 100 is a VR NED, the main optic 320 is positioned such that the user of the VR NED looks into the main optic 320 to view the expanded image light 335 from the waveguide display 310. The main optic 320 is configured to block the light 345 coming from the local area 340 surrounding the VR NED. Thus, the light 355 that reaches the eye-box 340 and the eye 330 includes virtual reality content without real-world content, wherein a field-of-view of the user is expanded. It should be understood that the VR NED operates the same as the AR NED except that the second (outer) surface 365 is opaque so no ambient light is provided to the eye-box 340. Alternatively, a blocking element (not shown in FIG. 3) may be positioned between the local area 350 and the second surface 365 to block the ambient light 345 from reaching the eye-box 340.

In some embodiments, the cross-section 300 in FIG. 3 includes an eye tracker 370 configured to determine a position of the eye 330 in the eye-box 340. Note that information about the position of the eye 330 also include information about an orientation of the eye 330, i.e., information about user's eye gaze location. The eye tracker 370 includes one or more light emitters 375, an imaging device (camera) 380 and a controller coupled to the imaging device 380 or integrated into the imaging device 380 (not shown in FIG. 3). As shown in FIG. 3, the components of the eye tracker 370 are positioned outside the field-of-view of the user.

The one or more light emitters 375 may be coupled to the main optic 320. The one or more light emitters 370 are configured to emit one or more optical beams toward the eye-box 340. The imaging device 380 is configured to capture an image of the eye 330 illuminated with the one or more optical beams emitted from the one or more light emitters 375. In one embodiment (illustrated in FIG. 3), the imaging device is pointed at the eye 330. In this case, the imaging device 380 is configured to capture portions of the one or more optical beams directly reflected from at least one surface of the eye 330. In another embodiment (not shown in FIG. 3), the imaging device 380 is pointed at the main optic 320. In this case, the imaging device 380 is configured to capture portions of the one or more optical beams reflected from at least one surface of the eye 330 and then from the first partially reflective surface 360 of the main optic 320 before being captured by the imaging device 380. The imaging device 380 may include a charge-coupled device (CCD) detector, a complementary metal-oxide-semiconductor (CMOS) detector or some other types of detectors (not shown in FIG. 3).

The controller coupled to the imaging device 380 or integrated into the imaging device 380 determines the position of the eye 330 based on the image of the eye 330 captured by the imaging device 380. In one embodiment, the eye 330 is illuminated with a structured light pattern. Then, the eye tracker 370 (e.g., via the controller) can use locations of the reflected structured light pattern in a captured image to determine eye position and eye-gaze. In another embodiment, the eye tracker 370 (e.g., via the controller) determines eye position and eye-gaze based on magnitudes of image light captured over a plurality of time instants.

The eye tracker 370 may be also coupled (e.g., via the controller) to the source assembly 305 and/or the focusing element 315 (not shown in FIG. 3). The eye tracker 370 may, at least partially, control operations of the source assembly 305 and/or the focusing element 315 in order to adjust the image light 325 emitted from the source assembly 305 and/or the expanded image light 335 out-coupled from the waveguide 310, based on the determined position of the eye 330. In some embodiments, the eye tracker 370 controls operation of the source assembly 305 to adjust a resolution of the image light 325 to facilitate foveated rendering of the light 355 reaching the eye 330. For example, the eye tracker 370 may instruct the source assembly 305 to provide a maximum resolution of the image light 325 in a foveal region of the determined eye-gaze. In the same time, the eye tracker 370 may instruct the source assembly 305 to use a lower resolution of the image light 325 in other regions, without negatively affecting the user's visual experience.

Alternatively or additionally, the eye tracker 370 may control optical power of the focusing element 315 and/or an adjustable distance of the focusing element 315 from the waveguide 310 in order to adjust focus of the expanded image light 335 such that at least a portion the expanded image light 335 is in focus at the determined eye-gaze location. In one or more embodiments, when the focusing element 315 is implemented as a liquid crystal lens, the eye tracker 370 controls a voltage level applied to the focusing element 315 to change an optical power of the focusing element 315 and adjust focus of the expanded image light 335. In one or more other embodiments, the eye tracker 370 is mechanically coupled to the focusing element 315, which is implemented as, e.g., a passive optical element. The eye tracker 370 may than adjust a distance between the focusing element 315 and the waveguide 310 in order to adjust focus of the expanded image light 335. Furthermore, by adjusting focus of the expanded image light 335 by using the focusing element 315, the eye tracker 370 can also mitigate VAC of the expanded image light 335. In some embodiments, a module separate from the eye tracker 370 (e.g., a varifocal module, not shown in FIG. 3) can control operations of the source assembly 305 and/or the focusing element 315 (e.g., based on the determined position of the eye 330) to adjust focus of the expanded image light 335 and mitigate the VAC. The eye tracker 370 and/or the varifocal module may perform various other applications based at least in part on the determined position of the eye 330. The applications include, but are not limited to, providing user interfaces (e.g., gaze-based selection), attention estimation (e.g., for user safety), different gaze-contingent display modes (e.g., synthetic depth of field rendering), metric scaling for depth and parallax correction (e.g., inter-pupillary distance (IPD) and eye-box adjustment), etc. Additional details regarding systems with varifocal capability are discussed in U.S. Application Ser. No. 14/963,126, filed Dec. 8, 2015, U.S. application Ser. No. 15/407,701, filed Jan. 17, 2017, U.S. Application No. 62/458,866, filed Feb. 14, 2017, and are herein incorporated by reference in their entirety.

System Environment

Figure 4:
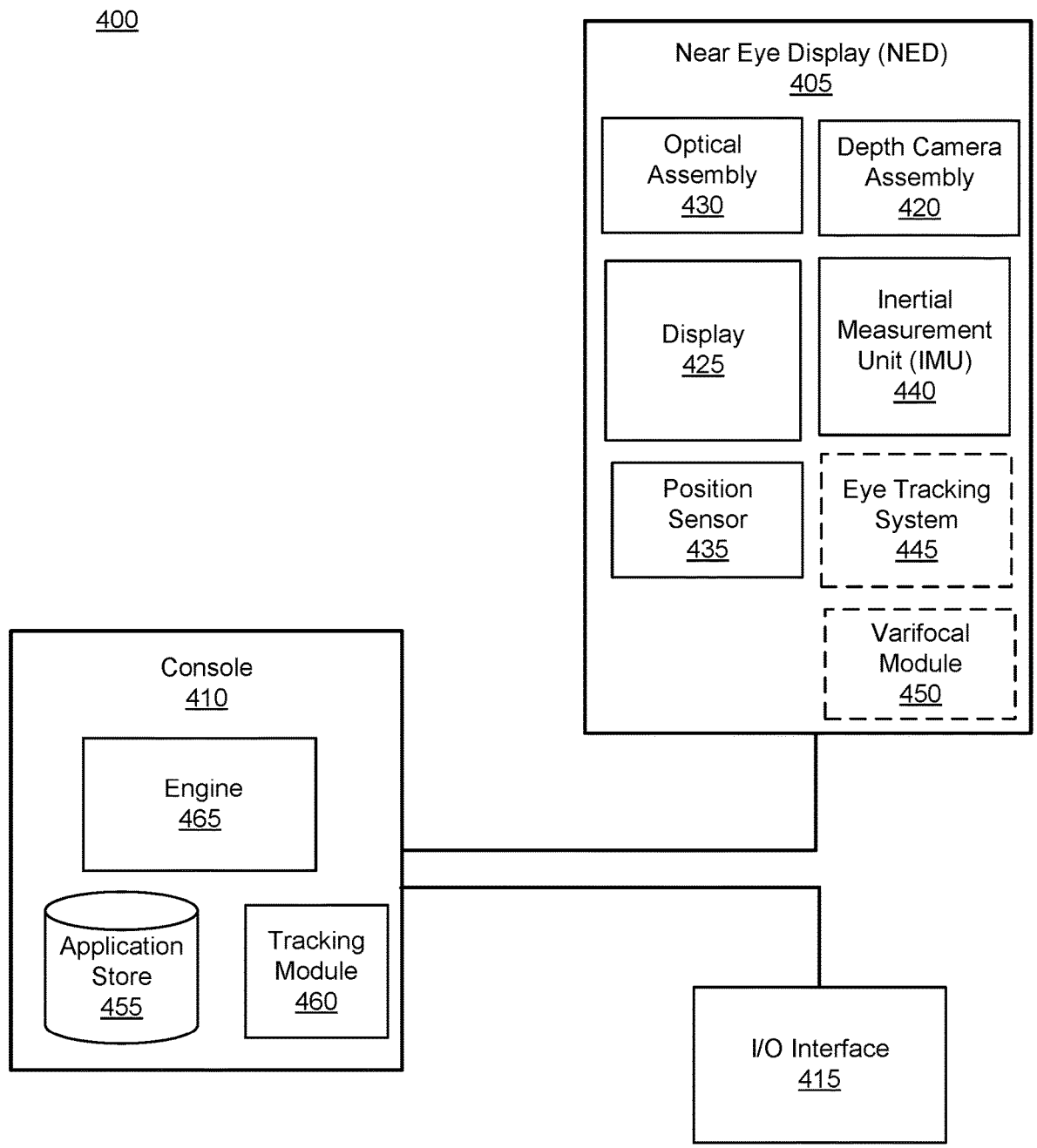
FIG. 4 is a block diagram of a system environment that includes the NED shown in FIG. 1, in accordance with an embodiment.

FIG. 4 is a block diagram of one embodiment of a NED system 400 in which a console 410 operates. The NED system 400 may operate in a VR system environment, an AR system environment, a MR system environment, or some combination thereof. The NED system 400 shown by FIG. 4 comprises a NED 405 and an input/output (I/O) interface 415 that is coupled to the console 410. While FIG. 4 shows an example NED system 400 including one NED 405 and on I/O interface 415, in other embodiments any number of these components may be included in the NED system 400. For example, there may be multiple NEDs 405 each having an associated I/O interface 415, with each NED 405 and I/O interface 415 communicating with the console 410. In alternative configurations, different and/or additional components may be included in the NED system 400. Additionally, functionality described in conjunction with one or more of the components shown in FIG. 4 may be distributed among the components in a different manner than described in conjunction with FIG. 4 in some embodiments. For example, some or all of the functionality of the console 410 is provided by the NED 405.

The NED 405 is a near-eye display or a head-mounted display that presents content to a user comprising virtual and/or augmented views of a physical, real-world environment with computer-generated elements (e.g., two-dimensional or three-dimensional images, two-dimensional or three-dimensional video, sound, etc.). In some embodiments, the presented content includes audio that is presented via an external device (e.g., speakers and/or headphones) that receives audio information from the NED 405, the console 410, or both, and presents audio data based on the audio information. The NED 405 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the NED 405 is the NED 100 described above in conjunction with FIG. 1.

The NED 405 may include a DCA 420, a display 425, an optical assembly 430, one or more position sensors 435, an IMU 440, an optional eye tracking system 445, and an optional varifocal module 450. In some embodiments, the display 425 and the optical assembly 430 can be together integrated into a projection assembly, as described above in conjunction with FIGS. 2-3. Some embodiments of the NED 405 have different components than those described in conjunction with FIG. 4. Additionally, the functionality provided by various components described in conjunction with FIG. 4 may be differently distributed among the components of the NED 405 in other embodiments.

The DCA 420 captures data describing depth information of an area surrounding the NED 405. The data describing depth information may be associated with one or a combination of the following techniques used to determine depth information: structured light, time of flight, or some combination thereof. The DCA 420 can compute the depth information using the data, or the DCA 420 can send this information to another device such as the console 410 that can determine the depth information using data from the DCA 420.

The DCA 420 includes an illumination source, an imaging device, and a controller. The illumination source emits light onto an area surrounding the NED 405. In an embodiment, the emitted light is a structured light. The illumination source includes a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic light-emitting diodes (LEDs), a vertical-cavity surface-emitting laser (VCSEL), or some other source. In some embodiments, a single emitter or a plurality of emitters in the illumination source can emit light having a structured light pattern. The imaging device captures ambient light and light from one or more emitters of the plurality of emitters that is reflected from objects in the area. The imaging device may be an infrared camera or a camera configured to operate in a visible spectrum. The controller coordinates how the illumination source emits light and how the imaging device captures light. In some embodiments, the controller also determines depth information associated with the local area using the captured images.

The display 425 displays two-dimensional or three-dimensional images to the user in accordance with data received from the console 410. In various embodiments, the display 425 comprises a single display or multiple displays (e.g., a display for each eye of a user). In some embodiments, the display 425 comprises a single or multiple waveguide displays. Light can be coupled into the single or multiple waveguide displays via, e.g., a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, a laser-based display, one or more waveguides, some other display, a scanner, one-dimensional array, or some combination thereof. An embodiment of the display 425 is the projection assembly 210 described above in conjunction with FIGS. 2-3.

The optical assembly 430 magnifies image light received from the display 425, corrects optical errors associated with the image light, and presents the corrected image light to a user of the NED 405. The optical assembly 430 includes a plurality of optical elements. Example optical elements included in the optical assembly 430 include: an aperture, a Fresnel lens, a convex lens, a concave lens, a filter, a reflecting surface, or any other suitable optical element that affects image light. Moreover, the optical assembly 430 may include combinations of different optical elements. In some embodiments, one or more of the optical elements in the optical assembly 430 may have one or more coatings, such as partially reflective or anti-reflective coatings. The optical assembly 430 can be integrated into a projection assembly, e.g., the projection assembly 210, as discussed in conjunction with FIG. 3.

Magnification and focusing of the image light by the optical assembly 430 allows the display 425 to be physically smaller, weigh less and consume less power than larger displays. Additionally, magnification may increase the field of view of the content presented by the display 425. For example, the field of view of the displayed content is such that the displayed content is presented using almost all (e.g., approximately 110 degrees diagonal), and in some cases all, of the user's field of view. Additionally in some embodiments, the amount of magnification may be adjusted by adding or removing optical elements.

In some embodiments, the optical assembly 430 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the display 425 for display is pre-distorted, and the optical assembly 430 corrects the distortion when it receives image light from the display 425 generated based on the content. In some embodiments, as discussed in conjunction with FIGS. 2-3, elements of the optical assembly 430 are integrated into the display 425 as a projection assembly that includes at least one waveguide coupled with one or more optical elements.

The IMU 440 is an electronic device that generates data indicating a position of the NED 405 based on measurement signals received from one or more of the position sensors 435 and from depth information received from the DCA 420. A position sensor 435 generates one or more measurement signals in response to motion of the NED 405. Examples of position sensors 435 include: one or more accelerometers, one or more gyroscopes, one or more magnetometers, another suitable type of sensor that detects motion, a type of sensor used for error correction of the IMU 440, or some combination thereof. The position sensors 435 may be located external to the IMU 440, internal to the IMU 440, or some combination thereof.

Based on the one or more measurement signals from one or more position sensors 435, the IMU 440 generates data indicating an estimated current position of the NED 405 relative to an initial position of the NED 405. For example, the position sensors 435 include multiple accelerometers to measure translational motion (forward/back, up/down, left/right) and multiple gyroscopes to measure rotational motion (e.g., pitch, yaw, roll). In some embodiments, the IMU 440 rapidly samples the measurement signals and calculates the estimated current position of the NED 405 from the sampled data. For example, the IMU 440 integrates the measurement signals received from the accelerometers over time to estimate a velocity vector and integrates the velocity vector over time to determine an estimated current position of a reference point on the NED 405. Alternatively, the IMU 440 provides the sampled measurement signals to the console 410, which interprets the data to reduce error. The reference point is a point that may be used to describe the position of the NED 405. The reference point may generally be defined as a point in space or a position related to the NED's 405 orientation and position.

The IMU 440 receives one or more parameters from the console 410. The one or more parameters are used to maintain tracking of the NED 405. Based on a received parameter, the IMU 440 may adjust one or more IMU parameters (e.g., sample rate). In some embodiments, certain parameters cause the IMU 440 to update an initial position of the reference point so it corresponds to a next position of the reference point. Updating the initial position of the reference point as the next calibrated position of the reference point helps reduce accumulated error associated with the current position estimated the IMU 440. The accumulated error, also referred to as drift error, causes the estimated position of the reference point to "drift" away from the actual position of the reference point over time. In some embodiments of the NED 405, the IMU 440 may be a dedicated hardware component. In other embodiments, the IMU 440 may be a software component implemented in one or more processors.

In some embodiments, the eye tracking system 445 is integrated into the NED 405. The eye tracking system 445 determines eye tracking information associated with an eye of a user wearing the NED 405. The eye tracking information determined by the eye tracking system 445 may comprise information about a position of the user's eye, i.e., information about an angle of an eye-gaze. An embodiment of the eye-tracking system 445 is the eye tracker 370 described above in conjunction with FIG. 3, and may comprise one or more illumination sources and an imaging device (camera).

In some embodiments, the varifocal module 450 is further integrated into the NED 405. The varifocal module 450 may be coupled to the eye tracking system 445 to obtain eye tracking information determined by the eye tracking system 445. The varifocal module 450 may be configured to adjust focus of image light emitted from the display 425, based on the determined eye tracking information obtained from the eye tracking system 445. In this way, the varifocal module 450 can mitigate vergence-accommodation conflict in relation to the image light. The varifocal module 450 can be interfaced (e.g., either mechanically or electrically) with at least one optical element of the optical assembly 430. Then, the varifocal module 450 may be configured to adjust focus of the image light emitted from the display 425 and propagated through the optical assembly 430 by adjusting an optical position of the at least one optical element of the optical assembly 430, based on the determined eye tracking information obtained from the eye tracking system 445. By adjusting the optical position, the varifocal module 450 varies focus of the image light propagated through the optical assembly 430 towards the user's eye. The varifocal module 450 may be also configured to adjust resolution of the image light emitted by the display 425 by performing foveated rendering of the image light, based at least in part on the determined eye tracking information obtained from the eye tracking system 445. In this case, the varifocal module 450 provides appropriate image signals to the display 425. The varifocal module 450 provides image signals with a maximum pixel density for the display 425 only in a foveal region of the user's eye-gaze, while providing image signals with lower pixel densities in other regions.

The I/O interface 415 is a device that allows a user to send action requests and receive responses from the console 410. An action request is a request to perform a particular action. For example, an action request may be an instruction to start or end capture of image or video data or an instruction to perform a particular action within an application. The I/O interface 415 may include one or more input devices. Example input devices include: a keyboard, a mouse, a game controller, or any other suitable device for receiving action requests and communicating the action requests to the console 410. An action request received by the I/O interface 415 is communicated to the console 410, which performs an action corresponding to the action request. In some embodiments, the I/O interface 415 includes an IMU 440 that captures calibration data indicating an estimated position of the I/O interface 415 relative to an initial position of the I/O interface 415. In some embodiments, the I/O interface 415 may provide haptic feedback to the user in accordance with instructions received from the console 410. For example, haptic feedback is provided when an action request is received, or the console 410 communicates instructions to the I/O interface 415 causing the I/O interface 415 to generate haptic feedback when the console 410 performs an action.

The console 410 provides content to the NED 405 for processing in accordance with information received from one or more of: the DCA 420, the NED 405, and the I/O interface 415. In the example shown in FIG. 4, the console 410 includes an application store 455, a tracking module 460, and an engine 465. Some embodiments of the console 410 have different modules or components than those described in conjunction with FIG. 4. Similarly, the functions further described below may be distributed among components of the console 410 in a different manner than described in conjunction with FIG. 4.

The application store 455 stores one or more applications for execution by the console 410. An application is a group of instructions, that when executed by a processor, generates content for presentation to the user. Content generated by an application may be in response to inputs received from the user via movement of the NED 405 or the I/O interface 415. Examples of applications include: gaming applications, conferencing applications, video playback applications, or other suitable applications.

The tracking module 460 calibrates the NED system 400 using one or more calibration parameters and may adjust one or more calibration parameters to reduce error in determination of the position of the NED 405 or of the I/O interface 415. For example, the tracking module 460 communicates a calibration parameter to the DCA 420 to adjust the focus of the DCA 420 to more accurately determine positions of structured light elements captured by the DCA 420. Calibration performed by the tracking module 460 also accounts for information received from the IMU 440 in the NED 405 and/or an IMU 440 included in the I/O interface 415. Additionally, if tracking of the NED 405 is lost (e.g., the DCA 420 loses line of sight of at least a threshold number of structured light elements), the tracking module 460 may re-calibrate some or all of the NED system 400.

The tracking module 460 tracks movements of the NED 405 or of the I/O interface 415 using information from the DCA 420, the one or more position sensors 435, the IMU 440 or some combination thereof. For example, the tracking module 460 determines a position of a reference point of the NED 405 in a mapping of a local area based on information from the NED 405. The tracking module 460 may also determine positions of the reference point of the NED 405 or a reference point of the I/O interface 415 using data indicating a position of the NED 405 from the IMU 440 or using data indicating a position of the I/O interface 415 from an IMU 440 included in the I/O interface 415, respectively. Additionally, in some embodiments, the tracking module 460 may use portions of data indicating a position or the NED 405 from the IMU 440 as well as representations of the local area from the DCA 420 to predict a future location of the NED 405. The tracking module 460 provides the estimated or predicted future position of the NED 405 or the I/O interface 415 to the engine 465.

The engine 465 generates a three-dimensional mapping of the area surrounding the NED 405 (i.e., the "local area") based on information received from the NED 405. In some embodiments, the engine 465 determines depth information for the three-dimensional mapping of the local area based on information received from the DCA 420 that is relevant for techniques used in computing depth. The engine 465 may calculate depth information using one or more techniques in computing depth from the portion of the reflected light detected by the DCA 420, such as the stereo based techniques, the structured light illumination technique, and the time-of-flight technique. In various embodiments, the engine 465 uses the depth information to, e.g., update a model of the local area, and generate content based in part on the updated model.

The engine 465 also executes applications within the NED system 400 and receives position information, acceleration information, velocity information, predicted future positions, or some combination thereof, of the NED 405 from the tracking module 460. Based on the received information, the engine 465 determines content to provide to the NED 405 for presentation to the user. For example, if the received information indicates that the user has looked to the left, the engine 465 generates content for the NED 405 that mirrors the user's movement in a virtual environment or in an environment augmenting the local area with additional content. Additionally, the engine 465 performs an action within an application executing on the console 410 in response to an action request received from the I/O interface 415 and provides feedback to the user that the action was performed. The provided feedback may be visual or audible feedback via the NED 405 or haptic feedback via the I/O interface 415.

In some embodiments, based on the eye tracking information (e.g., orientation of the user's eye) received from the eye tracking system 445, the engine 465 determines resolution of the content provided to the NED 405 for presentation to the user on the display 425. The engine 465 may be configured to adjust resolution of the content provided to the NED 405 by performing foveated rendering of the presented content, based at least in part on the determined eye tracking information obtained from the eye tracking system 445. The engine 465 provides the content to the NED 405 having a maximum resolution on the display 425 in a foveal region of the user's gaze, whereas the engine 465 provides a lower resolution in other regions, thus achieving less power consumption at the NED 405 and saving computing cycles of the console 410 without compromising a visual experience of the user. In some embodiments, the engine 465 can further use the eye tracking information to adjust focus of the image light emitted from the display 425 to prevent the VAC.

ADDITIONAL CONFIGURATION INFORMATION

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A projection assembly comprising:
   a waveguide outside of a field of view (FOV) of an eye, the waveguide configured to expand in-coupled image light in at least one dimension and outcouple the expanded image light; and
   an integrated optical element comprising a plurality of surfaces designed for a projected FOV that is larger than the FOV of the eye, the integrated optical element at least partially inside the FOV of the eye, and the integrated optical element is configured to:
      direct ambient light from a local area to propagate substantially parallel to an axis into an eye-box that covers the projected FOV, and
      while directing the ambient light from the local area, reflect the expanded image light from each of the plurality of surfaces to generate a version of the expanded image light covering the projected FOV and propagating substantially parallel to the axis into the eye-box.

2. The projection assembly of claim 1, further comprising a focusing element outside of the FOV of the eye and coupled to the waveguide, the focusing element configured to:
   receive the expanded image light from the waveguide,
   optically correct the expanded image light, and
   direct the optically corrected expanded image light to the integrated optical element.

3. The projection assembly of claim 2, wherein the focusing element includes a variable power optical element configured to adjust an optical power of the expanded image light.

4. The projection assembly of claim 3, wherein the variable power optical element comprises a liquid crystal lens.

5. The projection assembly of claim 3, wherein the variable power optical element comprises a lens including a liquid media and having at least one actively controlled deformable surface.

6. The projection assembly of claim 2, wherein the focusing element is between the waveguide and the integrated optical element at an adjustable distance from the waveguide.

7. The projection assembly of claim 6, further comprising a controller coupled to at least one of the focusing element and the waveguide, the controller configured to:
   obtain information about an accommodation plane; and
   adjust the distance to change an effective optical power of the focusing element by instructing the focusing element or the waveguide to move, based on the information about the accommodation plane.

8. The projection assembly of claim 1, further comprising a source assembly configured to emit the image light in-coupled by the waveguide, the source assembly selected from a group consisting of a one-dimensional array of micro light-emitting diodes (µLEDs) with a microelectromechanical system (MEMS) mirror, a two-dimensional array of µLEDs, a one-dimensional array of lasers with a scanning MEMS mirror, and a two-dimensional scanning laser.

9. The projection assembly of claim 1, wherein:
   the integrated optical element includes a first partially reflective optical surface and a second partially reflective optical surface of the plurality of surfaces and there is an air gap between the first partially reflective optical surface and the second partially reflective optical surface;
   the first partially reflective surface receives the expanded image light at a first incident angle larger than a threshold angle such that the first partially reflective surface reflects the expanded image light toward the second partially reflective surface; and
   the second partially reflective surface receives the expanded image light reflected from the first partially reflective surface at a second incident angle smaller than the threshold angle such that the second partially reflective surface directs the expanded image light to the eye-box.

10. The projection assembly of claim 9, wherein the first partially reflective optical surface and the second partially reflective optical surface are coated to reflect the expanded image light and to propagate the ambient light from the local area.

11. The projection assembly of claim 1, wherein:
   the integrated optical element is a single monolithic optical element that includes a first partially reflective optical surface and a second partially reflective optical surface of the plurality of surfaces;
   the first partially reflective surface receives the expanded image light at a first incident angle larger than a threshold angle such that the first partially reflective surface reflects the expanded image light toward the second partially reflective surface; and
   the second partially reflective surface receives the expanded image light reflected from the first partially reflective surface at a second incident angle smaller than the threshold angle such that the second partially reflective surface directs the expanded image light to the eye-box.

12. The projection assembly of claim 1, further comprising an eye tracker configured to determine a position of the eye in the eye-box.

13. The projection assembly of claim 12, wherein the eye tracker comprises:
   one or more light emitters positioned outside of the FOV of the eye and coupled to the integrated optical element, the one or more light emitters configured to emit one or more optical beams;
   an imaging device positioned outside of the FOV of the eye, the imaging device configured to capture an image of the eye illuminated with the one or more optical beams; and
   a controller coupled to the imaging device, the controller configured to:
      determine the position of the eye based on the captured image, and
      adjust the expanded image light emitted from the projection assembly based on the determined position of the eye.

14. The projection assembly of claim 13, wherein the controller is further configured to adjust focus of the expanded image light based on the determined position of the eye.

15. The projection assembly of claim 13, wherein the controller is further configured to adjust resolution of the expanded image light based on the determined position of the eye.

16. A projection assembly comprising:
   a waveguide outside of a field of view (FOV) of an eye, the waveguide configured to expand in-coupled image light in at least one dimension and outcouple the expanded image light; and
   an integrated optical element comprising a plurality of surfaces designed for a projected FOV that is larger than the FOV of the eye, the integrated optical element at least partially inside the FOV of the eye, and the integrated optical element is configured to:
  block ambient light coming from a local area substantially parallel to an axis and received at the integrated optical element from further propagating toward an eye-box that covers the projected FOV, and
  while blocking the ambient light from further propagating toward the eye-box, reflect the expanded image light from each of the plurality of surfaces to generate a version of the expanded image light covering the projected FOV and propagating substantially parallel to the axis toward the eye-box.

17. The projection assembly of claim 16, further comprising a focusing element outside of the FOV of the eye between the waveguide and the integrated optical element at an adjustable distance from the waveguide, the focusing element configured to:
  receive the expanded image light from the waveguide,
  optically correct the expanded image light, and
  direct the optically corrected expanded image light to the integrated optical element.

18. The projection assembly of claim 17, further comprising a controller coupled to at least one of the focusing element and the waveguide, the controller configured to:
  obtain information about an accommodation plane; and
  adjust the distance to change an effective optical power of the focusing element by instructing the focusing element or the waveguide to move, based on the information about the accommodation plane.

19. The projection assembly of claim 16, wherein:
  the integrated optical element includes a first partially reflective optical surface and a second partially reflective optical surface of the plurality of surfaces and there is an air gap between the first partially reflective optical surface and the second partially reflective optical surface;
  the first partially reflective surface receives the expanded image light at a first incident angle larger than a threshold angle such that the first partially reflective surface reflects the expanded image light toward the second partially reflective surface; and
  the second partially reflective surface receives the expanded image light reflected from the first partially reflective surface at a second incident angle smaller than the threshold angle such that the second partially reflective surface directs the expanded image light to the eye-box.

20. The projection assembly of claim 16, further comprising an eye tracker configured to determine a position of the eye in the eye-box, the eye tracker comprises:
  one or more light emitters positioned outside of the FOV of the eye and coupled to the integrated optical element, the one or more light emitters configured to emit one or more optical beams;
  an imaging device positioned outside of the FOV of the eye, the imaging device configured to capture an image of the eye illuminated with the one or more optical beams; and
  a controller coupled to the imaging device, the controller configured to:
    determine the position of the eye based on the captured image, and
    adjust the expanded image light emitted from the projection assembly based on the determined position of the eye.

* * * * *